(12) United States Patent
Wang et al.

(10) Patent No.: US 12,240,503 B2
(45) Date of Patent: Mar. 4, 2025

(54) METHOD FOR CONTROLLING VEHICLE, ELECTRONIC DEVICE, STORAGE MEDIUM AND VEHICLE

(71) Applicant: Apollo Intelligent Connectivity (Beijing) Technology Co., Ltd., Beijing (CN)

(72) Inventors: Yuan Wang, Beijing (CN); Liantao Li, Beijing (CN); Shenglin Qin, Beijing (CN)

(73) Assignee: Apollo Intelligent Connectivity (Beijing) Technology Co., Ltd., Beijing (CN)

(*) Notice: Subject to any disclaimer, the term of this patent is extended or adjusted under 35 U.S.C. 154(b) by 258 days.

(21) Appl. No.: 17/951,449

(22) Filed: Sep. 23, 2022

(65) Prior Publication Data

US 2023/0010007 A1   Jan. 12, 2023

(30) Foreign Application Priority Data

Sep. 24, 2021 (CN) .......................... 202111125672.1

(51) Int. Cl.
 *B60W 50/00* (2006.01)
 *B60W 60/00* (2020.01)
(52) U.S. Cl.
 CPC .... *B60W 60/0051* (2020.02); *B60W 50/0098* (2013.01); *B60W 60/001* (2020.02);
(Continued)

(58) Field of Classification Search
 CPC ......... B60W 60/0051; B60W 50/0098; B60W 60/001; B60W 2520/10; B60W 2540/18;
(Continued)

(56) References Cited

U.S. PATENT DOCUMENTS 10,962,372 B1   3/2021  Rao
11,608,066 B1*  3/2023  Mcpeek-Bechtold .......................
                                                         B60W 30/143
(Continued)

FOREIGN PATENT DOCUMENTS

CN   102636177 A   8/2012
CN   106338988 A   1/2017
(Continued)

OTHER PUBLICATIONS

Official Communication issued in corresponding European Patent Application No. 22197551.9, mailed on Feb. 21, 2023.
(Continued)

*Primary Examiner* — Ashley L Redhead, Jr.
(74) *Attorney, Agent, or Firm* — Keating & Bennett, LLP

(57) ABSTRACT

A method for controlling a vehicle, an electronic device, a storage medium, and a vehicle are provided, related to a field of artificial intelligence technology, in particular to a field of autonomous driving and a field of computer vision. The method for controlling a vehicle includes: determining, in response to a request of switching to an autonomous driving mode, whether the vehicle is in a safe state; and controlling, in response to the vehicle being in the safe state, the vehicle to switch from a manual driving mode to the autonomous driving mode during travelling.

17 Claims, 6 Drawing Sheets

(52) U.S. Cl.
CPC ..... *B60W 2520/10* (2013.01); *B60W 2540/18* (2013.01); *B60W 2552/05* (2020.02)

(58) Field of Classification Search
CPC ......... B60W 2552/05; B60W 60/0015; B60W 2520/06; B60W 30/18154; B60W 50/082; B60W 2540/215; B60W 2556/50; B60W 2710/207; B60W 60/0053; B60W 50/14; B60W 60/0059; B60W 2050/146
See application file for complete search history.

(56) References Cited

U.S. PATENT DOCUMENTS

| | | | |
|---|---|---|---|
| 11,807,317 B2* | 11/2023 | Grossheim | B62D 5/049 |
| 2007/0219720 A1 | 9/2007 | Trepagnier et al. | |
| 2017/0008522 A1 | 1/2017 | Sato et al. | |
| 2017/0344005 A1 | 11/2017 | Zhu et al. | |
| 2017/0364070 A1* | 12/2017 | Oba | B60W 60/0059 |
| 2018/0017969 A1 | 1/2018 | Nagy et al. | |
| 2019/0138003 A1 | 5/2019 | Ming et al. | |
| 2019/0317506 A1* | 10/2019 | Ishioka | B60W 50/10 |
| 2019/0317520 A1 | 10/2019 | Zhang et al. | |
| 2020/0033147 A1 | 1/2020 | Ahn | |
| 2020/0241526 A1 | 7/2020 | Kim et al. | |
| 2020/0409351 A1 | 12/2020 | Zhu | |
| 2021/0024086 A1 | 1/2021 | Jin et al. | |
| 2021/0024097 A1* | 1/2021 | Jardine | B60W 60/001 |
| 2021/0101622 A1 | 4/2021 | Yu et al. | |
| 2021/0319332 A1* | 10/2021 | Isaac | G07C 5/085 |
| 2021/0355738 A1* | 11/2021 | Jang | B60R 21/015 |
| 2021/0366088 A1* | 11/2021 | Chae | G06T 5/90 |
| 2021/0402942 A1* | 12/2021 | Torabi | G06V 10/82 |
| 2022/0081001 A1 | 3/2022 | Xia et al. | |
| 2022/0081007 A1 | 3/2022 | Liu | |
| 2022/0161813 A1* | 5/2022 | Oba | B60K 35/80 |
| 2022/0185337 A1 | 6/2022 | Ming et al. | |
| 2023/0017970 A1* | 1/2023 | Oba | G01C 21/3626 |
| 2023/0033041 A1* | 2/2023 | Grossheim | B62D 15/025 |

FOREIGN PATENT DOCUMENTS

| | | |
|---|---|---|
| CN | 106864459 A | 6/2017 |
| CN | 107024927 A | 8/2017 |
| CN | 107564363 A | 1/2018 |
| CN | 107571864 A | 1/2018 |
| CN | 107672597 A | 2/2018 |
| CN | 107697072 A | 2/2018 |
| CN | 107943046 A | 4/2018 |
| CN | 108427417 A | 8/2018 |
| CN | 109496188 A | 3/2019 |
| CN | 109795492 A | 5/2019 |
| CN | 110104051 A | 8/2019 |
| CN | 110264720 A | 9/2019 |
| CN | 110466526 A | 11/2019 |
| CN | 110834638 A | 2/2020 |
| CN | 111634286 A | 9/2020 |
| CN | 111824160 A | 10/2020 |
| CN | 111994080 A | 11/2020 |
| CN | 112068566 A | 12/2020 |
| CN | 112078584 A | 12/2020 |
| CN | 112109734 A | 12/2020 |
| CN | 112236348 A | 1/2021 |
| CN | 112577510 A | 3/2021 |
| CN | 112654549 A | 4/2021 |
| CN | 112748720 A | 5/2021 |
| CN | 112793570 A | 5/2021 |
| CN | 112960001 A | 6/2021 |
| CN | 113022551 A | 6/2021 |
| CN | 113320548 A | 8/2021 |
| EP | 3 412 489 A1 | 12/2018 |
| EP | 3 842 311 A1 | 6/2021 |
| JP | 2016-088334 A | 5/2016 |
| WO | 2019/047650 A1 | 3/2019 |
| WO | 2019/122967 A1 | 6/2019 |
| WO | 2020/119281 A1 | 6/2020 |

OTHER PUBLICATIONS

Official Communication issued in corresponding Chinese Patent Application No. 202111125672.1, mailed on Nov. 24, 2023.
Official Communication issued in Chinese Patent Application No. 202111125672.1, mailed on Jul. 26, 2022.

* cited by examiner

METHOD FOR CONTROLLING VEHICLE, ELECTRONIC DEVICE, STORAGE MEDIUM AND VEHICLE

CROSS-REFERENCE TO RELATED APPLICATIONS

This application is claims priority to Chinese Application No. 202111125672.1 filed on Sep. 24, 2021, which is incorporated herein by reference in its entirety.

TECHNICAL FIELD

The present disclosure relates to a field of artificial intelligence technology, in particular to a field of autonomous driving and a field of computer vision, and especially to a method for controlling a vehicle, an electronic device, a storage medium, and a vehicle.

BACKGROUND

With the development of computer technology and network technology, in order to improve the convenience of travel, autonomous vehicles come into existence. When an autonomous vehicle is taken over by a vehicle operator, the autonomous driving system is often brought to a standstill. After the vehicle operator takes over the vehicle, in order to make the autonomous vehicle re-enter the autonomous driving mode, the vehicle operator is usually required to park the vehicle and activate the autonomous driving system.

SUMMARY

According to an aspect of the present disclosure, there is provided a method for controlling a vehicle, including: determining, in response to a request of switching to an autonomous driving mode, whether the vehicle is in a safe state; and controlling, in response to the vehicle being in the safe state, the vehicle to switch from a manual driving mode to the autonomous driving mode during travelling.

According to yet another aspect of the present disclosure, there is provided an electronic device, including: at least one processor; and a memory communicatively connected to the at least one processor, where the memory stores instructions executable by the at least one processor, and the instructions, when executed by the at least one processor, cause the at least one processor to implement the method for controlling a vehicle provided by the present disclosure.

According to yet another aspect of the present disclosure, there is provided a non-transitory computer-readable storage medium having computer instructions stored thereon, where the computer instructions allow a computer to implement the method for controlling a vehicle provided by the present disclosure.

According to yet another aspect of the present disclosure, there is provided an autonomous driving vehicle including the electronic device provided by the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solution and do not constitute a limitation to the present disclosure.

DETAILED DESCRIPTION OF EMBODIMENTS

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

The present disclosure provides a method for controlling a vehicle, an electronic device, a storage medium, and an autonomous driving vehicle, which may enter an autonomous driving mode more conveniently. The method for controlling a vehicle includes a state determination phase and a mode switching phase. In the state determination phase, in response to a request of switching to an autonomous driving mode, it is determined whether the vehicle is in a safe state. In the mode switching phase, in response to the vehicle being in the safe state, the vehicle is controlled to switch from a manual driving mode to the autonomous driving mode during the driving process.

An application scenario of the method and apparatus provided by the present disclosure will be described below with reference to FIG. 1.

Figure 1:
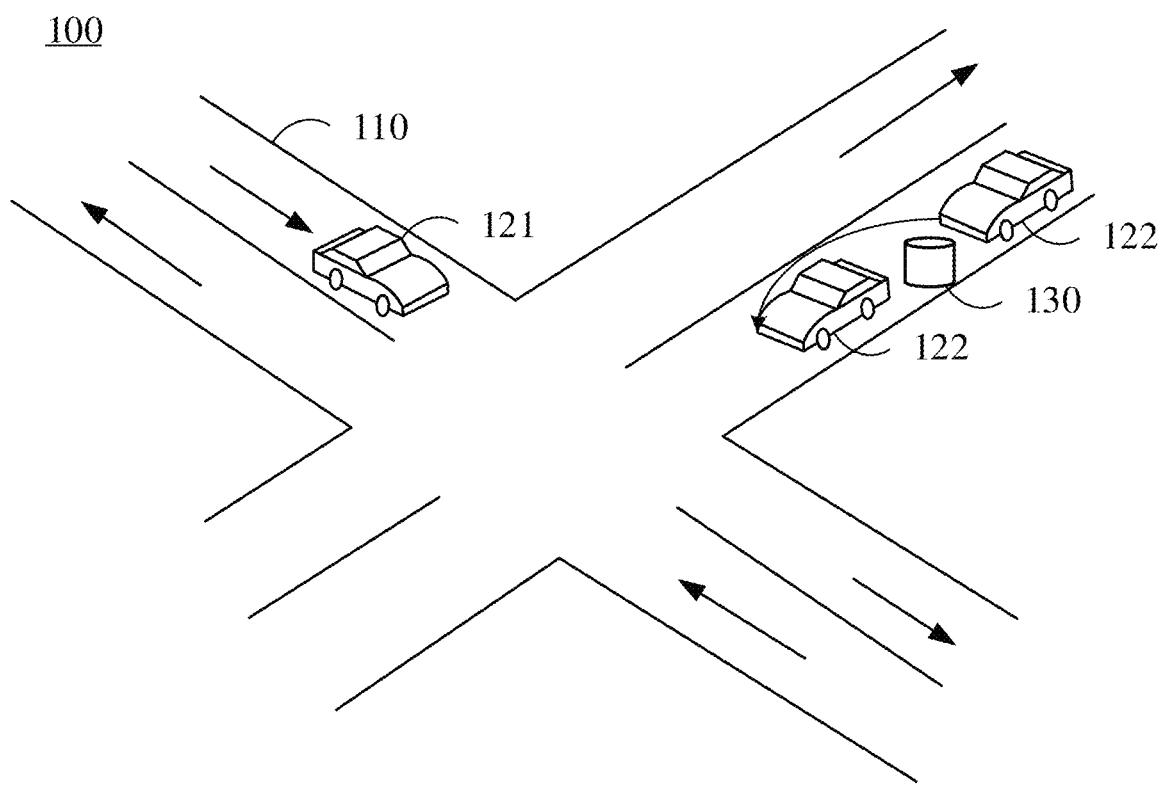
FIG. 1 shows a schematic diagram of an application scenario of a method and apparatus for controlling a vehicle according to an embodiment of the present disclosure.

FIG. 1 shows a schematic diagram of an application scenario of a method and apparatus for controlling a vehicle according to an embodiment of the present disclosure.

As shown in FIG. 1, the scenario 100 of this embodiment includes a road network 110 and a vehicle travelling on a road included in the road network 110. The road network may include a plurality of roads and intersection(s) formed by a convergence of the plurality of roads. The number of vehicles may be one or more. For example, in an embodiment, vehicles travelling on roads included in the road network 110 may include a vehicle 121 and a vehicle 122.

Either of the vehicle 121 and the vehicle 122 may be an autonomous driving vehicle or a human-driving vehicle. For example, the vehicle 122 may be an autonomous driving vehicle in which an autonomous driving system and at least one vision sensor are integrated. For example, the vehicle 122 may perform route planning based on an environmental information sensed by the vision sensor, and may perform autonomous driving based on the planned route.

In an embodiment, during the autonomous driving of the vehicle 122, if the vehicle 122 encounters an unavoidable obstacle 130 or a vehicle operator is required to intervene the driving, the vehicle 122 may slow down and stop, and the vehicle operator may take over the vehicle 122. After the vehicle operator takes over the vehicle 122, the vehicle 122 may switch from the autonomous driving mode to the manual driving mode in response to an operation on a steering wheel, an accelerator pedal, a brake pedal, or other brake tool by the vehicle operator. Alternatively, when the vehicle 122 is travelling in the autonomous driving mode, the vehicle 122 may directly switch from the autonomous driving mode to the manual driving mode in response to the operation on the steering wheel, the accelerator pedal, the brake pedal, and other brake tool by the vehicle operator, instead of being controlled to slow down and stop. In the manual driving mode, communication between the autonomous driving system and the vehicle bus control system may be maintained. In this way, after the vehicle 122 avoids the obstacle 130 under the control of the vehicle operator, or after the vehicle operator stops intervening the driving, the vehicle 122 may, for example, automatically switch from the manual driving mode to the autonomous driving mode in response to the operation of the vehicle operator on the vehicle being stopped, under the premise of safety.

In an embodiment, the vehicle 122 may further have a storage unit, for example, when the vehicle 122 switches from the autonomous driving mode to the manual driving mode, the current route planning information may be stored in the storage unit of the vehicle 122. When the vehicle switches from the manual driving mode to the autonomous driving mode again, the autonomous driving may be performed based on the route planning information stored in the storage unit.

It should be noted that the method for controlling a vehicle provided by the present disclosure may generally be performed by an autonomous driving control system of the vehicle 122. The apparatus for controlling a vehicle provided by the present disclosure may be integrated into the autonomous driving control system of the vehicle 122.

It should be understood that the type and number of vehicles and the type and number of road networks in FIG. 1 are only schematic. There may be any type and number of vehicles and any type and number of road networks as desired in practice.

The method for controlling a vehicle provided by the present disclosure will be described in detail below with reference to FIG. 2 to FIG. 5 in combination with FIG. 1.

Figure 2:
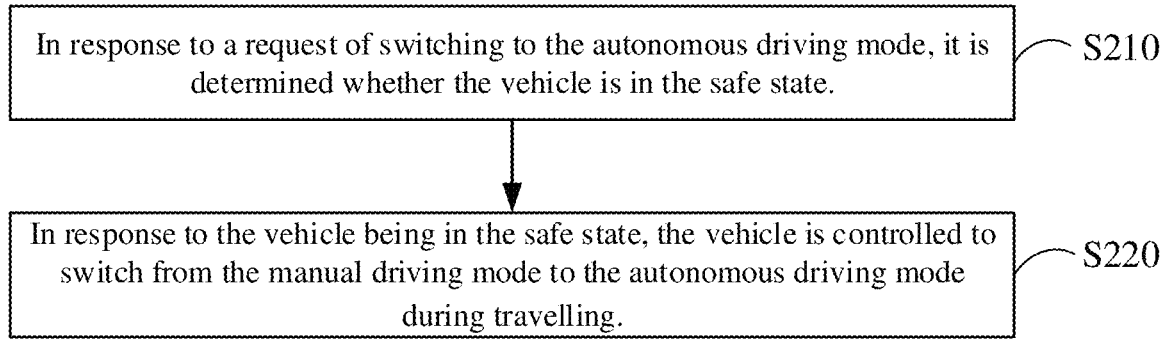
FIG. 2 shows a schematic flowchart of a method for controlling a vehicle according to an embodiment of the present disclosure.

FIG. 2 shows a schematic flowchart of a method for controlling a vehicle according to an embodiment of the present disclosure.

As shown in FIG. 2, the method 200 for controlling a vehicle of this embodiment may include operations S210 to S220.

In operation S210, in response to a request of switching to the autonomous driving mode, it is determined whether the vehicle is in the safe state.

According to an embodiment of the present disclosure, the request of switching to the autonomous driving mode may be generated in the manual driving mode in response to a detection of no touch by the vehicle operator on a steering wheel, a brake pedal, an accelerator pedal, a clutch, a gear, or other brake tool of the vehicle. Alternatively, the request may be generated in response to receiving from the vehicle operator a voice command of switching to the autonomous driving mode. Alternatively, a mode switching control element may be displayed on a touch panel of the vehicle, and a request of switching to the autonomous driving mode may be generated in response to a touch operation on the mode switching control element by the vehicle operator.

According to an embodiment of the present disclosure, it may be determined whether the vehicle is in the safe state based on an environmental information detected by a vision sensor of the vehicle and/or a location information detected by a positioning system, etc. For example, if the environmental information of the vehicle is relatively simple (for example, there are only a few vehicles around the vehicle) or the vehicle is not at an intersection, it may be determined that the vehicle is in the safe state.

According to an embodiment of the present disclosure, when the vehicle switches from the autonomous driving mode to the manual driving mode, the autonomous driving system of the vehicle, for example, operates in background instead of being turned off. In addition, the autonomous driving system remains in communication with the bus control system of the vehicle.

In operation S220, in response to the vehicle being in the safe state, the vehicle is controlled to switch from the manual driving mode to the autonomous driving mode during travelling.

According to an embodiment of the present disclosure, the vehicle may directly switch from the manual driving mode to the autonomous driving mode in response to determining that the vehicle is in the safe state, instead of being controlled to slow down and stop before activating the autonomous driving system.

It may be seen from the above that, with the method for controlling a vehicle provided by the embodiments of the present disclosure, the vehicle may, in a case that the vehicle is in a safe state, quickly switch to the autonomous driving mode after the vehicle is taken over by the vehicle operator, so that the vehicle operator does not have to stop the vehicle and then restart the autonomous driving system to switch to the autonomous driving mode. Therefore, compared with the prior art, the operation that is required for switching to the autonomous driving mode after the vehicle is taken over by the vehicle operator may be simplified, and the autonomous driving experience and the user experience may be improved.

Figure 3:
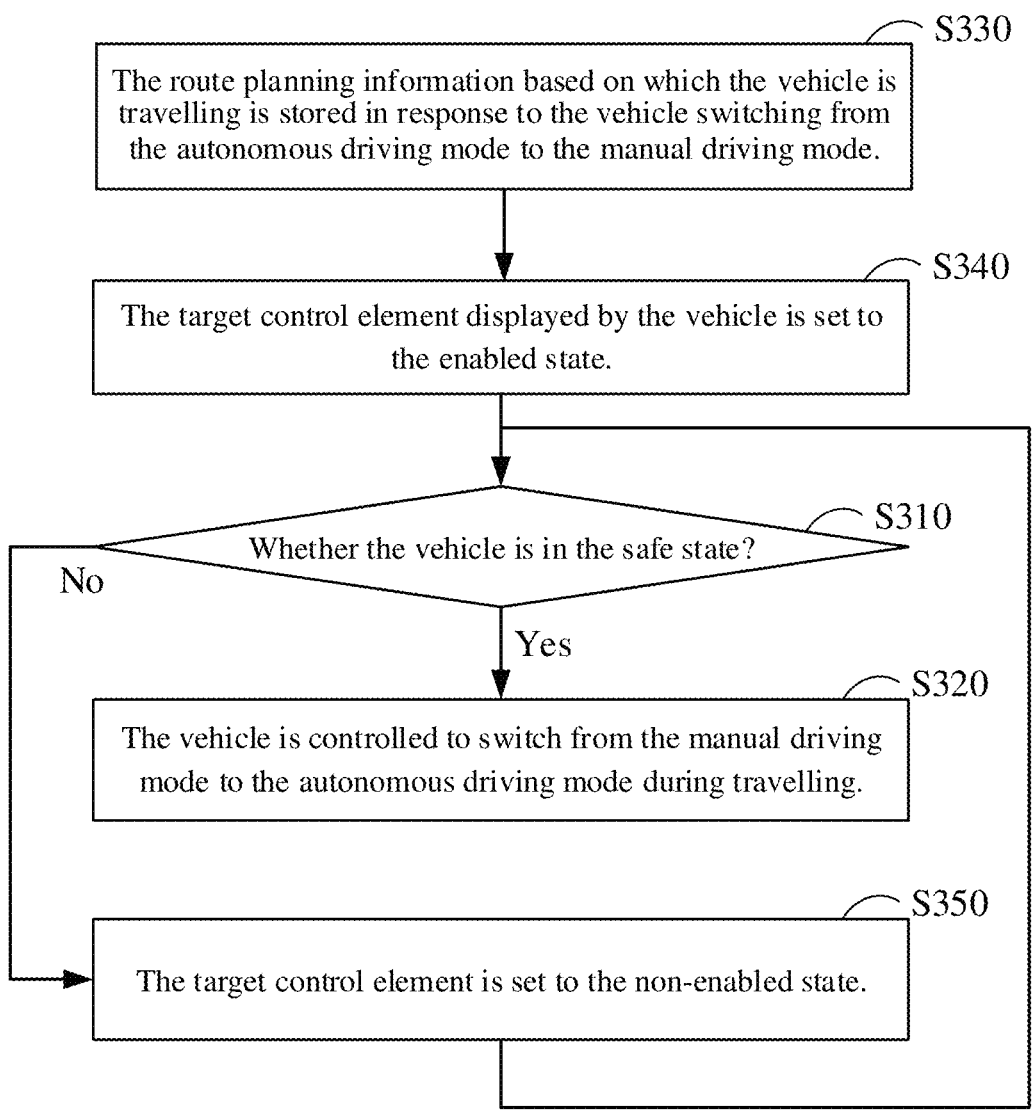
FIG. 3 shows a schematic flowchart of a method for controlling a vehicle according to another embodiment of the present disclosure.

FIG. 3 shows a schematic flowchart of a method for controlling a vehicle according to another embodiment of the present disclosure.

In an embodiment of the present disclosure, after a request of switching to an autonomous driving mode is generated, it may be determined whether the vehicle is in the safe state. Then, a response to the generated request of switching to autonomous driving mode may be made when the vehicle is in the safe state.

As shown in FIG. 3, in an embodiment, the method 300 for controlling a vehicle may include operations S310 to S330. Operation S310 is similar to operation S210 described above, and operation S320 is similar to operation S220 described above, which will not be repeated here. Operation S330 is performed before operation S310. After switching to the manual driving mode and performing operation S330, operation S310 may be performed first in response to the request of switching to the autonomous driving mode.

In operation S330, the route planning information based on which the vehicle is travelling is stored in response to the vehicle switching from the autonomous driving mode to the manual driving mode.

According to an embodiment of the present disclosure, the vehicle may switch the vehicle from the autonomous driving mode to the manual driving mode in response to the operation on the steering wheel, the brake pedal, the accelerator pedal, the clutch, the gear, and other brake tool of the vehicle by the vehicle operator. While switching to the manual driving mode, the route planning information which is determined by the vehicle in the autonomous driving mode based on the environment information, a starting point, and an ending point of the vehicle may be stored in the storage unit of the vehicle.

In this way, after the vehicle is determined to be in the safe state and the request of switching to the autonomous driving mode is generated, the stored route planning information may be acquired from the storage unit of the vehicle. Then, after the vehicle is switched from the manual driving mode to the autonomous driving mode, the vehicle may drive automatically based on the acquired route planning information. In this way, it is not needed to re-plan the route, so that the efficiency of switching to the autonomous driving mode may be improved.

In operation S310, it is determined whether the vehicle is in the safe state. Operation S320 is performed in response to the vehicle being in the safe state, so as to switch the vehicle from the manual driving mode to the autonomous driving mode.

According to an embodiment of the present disclosure, when determining whether the vehicle is in the safe state, a driving parameter of the vehicle may be determined in response to the request of switching to the autonomous driving mode. Then, it is determined whether the vehicle is in the safe state based on the driving parameter.

The driving parameter of the vehicle may include at least one of the following parameters: a speed of the vehicle, a direction along which the vehicle is travelling, an environmental information of the vehicle, a location of the vehicle, and the like. If the driving parameter of the vehicle meet a predetermined condition, it may be determined that the vehicle is in the safe state; otherwise, it may be determined that the vehicle is in an unsafe state. The predetermined condition may be set as desired.

For example, if the driving parameter includes the speed of the vehicle, the predetermined condition may include a condition that the speed of the vehicle is less than a speed threshold of the vehicle. The speed threshold of the vehicle may be, for example, 30 km/h, 20 km/m, 15 km/s, or other value set as desired, which is not limited in the present disclosure. With this predetermined condition, it is possible to avoid potential safety hazards caused by a high speed during the mode switching of the vehicle.

For example, if the driving parameter includes the location of the vehicle, the predetermined condition may include a condition that a distance between the location of the vehicle and an intersection is greater than a distance threshold. The distance threshold may be, for example, 30 m, 50 m, 100 m, or other value set as desired, which is not limited in the present disclosure. With this predetermined condition, it is possible to avoid the danger caused by a complex environment where the vehicle is located during the mode switching of the vehicle.

For example, if the driving parameter includes the direction along which the vehicle is travelling, the predetermined condition may include a condition that an angle between the direction along which the vehicle is travelling and a length direction of a lane where the vehicle is located is smaller than a first angle threshold. For example, the first angle threshold may be a value set as desired, such as ±15°, ±10°, etc., which is not limited in the present disclosure. With this predetermined condition, it is possible to avoid a potential collision with a vehicle in an adjacent lane or flowers and trees around the lane where the vehicle is located due to non-straight travelling during the mode switching of the vehicle.

For example, if the driving parameter includes the environmental information of the vehicle, the predetermined condition may include a condition that the number of other vehicles within a predetermined range surrounding the vehicle is less than a predetermined number. For example, the predetermined range may be a range centered a center point of the vehicle and having a radius such as 30 m, 50 m, 80 m, 100 m, etc., which is set as desired. For example, the predetermined number may be positively related to a size of the predetermined range. The predetermined number may be, for example, 3, 5, 10, or other value set as desired, which is not limited in the present disclosure. With this predetermined condition, a risk of collision with other vehicles during the mode switching of the vehicle may be avoided.

For example, the driving parameter may further include a rotation angle of the steering wheel of the vehicle, and the predetermined condition may include a condition that the rotation angle of the steering wheel of the vehicle is smaller than a second angle threshold. For example, the second angle threshold may be a value set as desired, such as 5°, 10°, 15°, etc., which is not limited in the present disclosure. With this predetermined condition, it is possible to avoid a potential collision with a vehicle in an adjacent lane, and flowers and trees around the lane where the vehicle is located, due to non-straight travelling during the mode switching of the vehicle.

It may be understood that the above predetermined conditions are only used as examples to facilitate understanding of the present disclosure, which are not limited in the present disclosure. In an embodiment, there may be a plurality of predetermined conditions, and the vehicle is determined to be in the safe state only when meeting all the plurality of predetermined conditions. For example, it is determined that the vehicle is in the safe state only in a case where the speed of the vehicle is less than 15 km/s, the vehicle goes straight (i.e., the angle between the direction along which the vehicle is travelling and the length direction of the lane where the vehicle is located is less than) 15°, and the vehicle is not within a range of an intersection (i.e., a distance between the location of the vehicle and the intersection is greater than 50 m). By setting the plurality of predetermined conditions, safety of the vehicle during the vehicle switching to the autonomous driving mode may be further improved.

According to an embodiment of the present disclosure, the request of switching to the autonomous driving mode may be generated in response to an operation by the vehicle operator on a target control element (e.g., the mode switching control element described above) displayed on the vehicle. For example, after the vehicle switches to the manual driving mode, a target control element for switching to the autonomous driving mode may be displayed in a default state by an onboard display of the vehicle. The default state of the target control element may be an enabled state. As such, a request of switching to the autonomous driving mode may be generated in response to an operation by the vehicle operator on the target control element in the enabled state. Accordingly, the above operation S310 may be performed after the request of switching to the autonomous driving mode is generated. Alternatively, as shown in FIG. 3, in the method 300 for controlling a vehicle in this embodiment, operation S340 may be first performed after operation S330, in order to set the target control element displayed by the vehicle into the enabled state, thereby ensuring that the target control element is operable by the vehicle operator to generate a request of switching to the autonomous driving mode.

If a determination result of operation S310 is that the vehicle is in the unsafe state, the method 300 for controlling a vehicle in this embodiment may further include, for example, operation S350.

In operation S350, the target control element is set to a non-enabled state. Specifically, the target control element may set to be gray, so that the target control element is not operable by the vehicle operator, thereby ensuring the safety of the vehicle. In addition, this may play a role of prompting the vehicle operator to control the travelling of the vehicle, so that the vehicle may change from the unsafe state to the safe state.

Subsequently, the process may return to operation S310 to periodically determine whether the vehicle is in the safe state, until the vehicle changes from the unsafe state to the safe state. Then operation S320 is performed to switch the vehicle from the manual driving mode to the autonomous driving mode.

In an embodiment, in response to determining that the vehicle changes from the unsafe state to the safe state after periodically determining whether the vehicle is in the safe state, the process may return to operation S340 to set the target control element to the enabled state, thereby prompting the vehicle operator that the current state of the vehicle allows the vehicle to switch to the autonomous driving mode. Then, in response to the vehicle operator operating the target control element again, operation S320 is performed again. In this way, the switching of the mode of the vehicle may be more in line with the user's needs, and thus the user experience may be improved.

Figure 4:
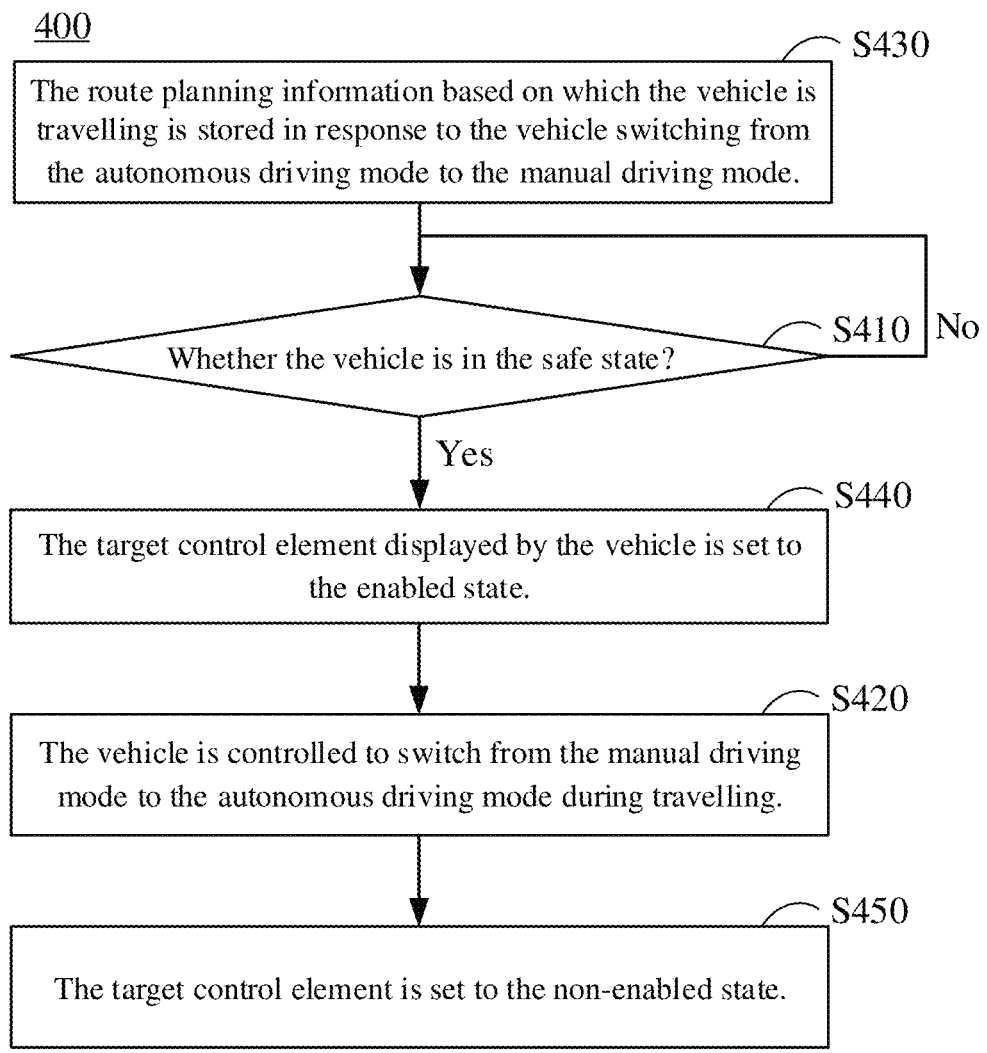
FIG. 4 shows a schematic flowchart of a method for controlling a vehicle according to another embodiment of the fundamental disclosure.

FIG. 4 shows a schematic flowchart of a method for controlling a vehicle according to another embodiment of the present disclosure.

According to an embodiment of the present disclosure, for example, it may be determined periodically whether the vehicle is in the safe state, after the vehicle switches from the autonomous driving mode to the manual driving mode. In this way, the efficiency of switching the mode in response to a request of switching to the autonomous driving mode may be improved. It is not need to determine, in response to the request of switching to autonomous driving mode, whether the vehicle is in the safe state through complex operating logic. In this embodiment, it may be directly determined whether to switch to the autonomous driving mode based on a result indicating whether the vehicle is in the safe state determined in the latest cycle.

For example, as shown in FIG. 4, the embodiment 400 includes operations S410 to S430. Operation S410 and operation S420 are respectively similar to operation S210 and operation S220 described above, and operation S430 is similar to operation S330 described above, which will not be repeated here. Operation S430 may be performed before operation S410.

In operation S410, it is periodically determined whether the vehicle is in the safe state. This operation S410 is similar to the implementation of the method for determining whether the vehicle is in the safe state described above. For example, in the operation S410, the driving parameter of the vehicle may be determined, and then it is determined whether the vehicle is in the safe state based on the driving parameters. The specific implementation method will not be repeated here.

Correspondingly, the onboard display of the vehicle may display a target control element for switching to the autonomous driving mode. The default state of the target control element may be the disabled state. As such, in the method for controlling a vehicle of this embodiment 400, operation S440 may be performed in a case of determining that the vehicle is in the safe state through operation S410. In the embodiment 400, in the case of determining that the vehicle is in the unsafe state through operation S410, operation S410 may be re-performed after a predetermined period of time until the vehicle is in the safe state. The predetermined time period may be set as desired, which is not limited in the present disclosure.

In operation S440, the target control element displayed by the vehicle is set to the enabled state. In this way, the vehicle operator may be prompted that the vehicle is currently in the safe state and is available for switching to the autonomous driving mode. In this embodiment, when the target control element is in the enabled state, a request of switching to the autonomous driving mode may be generated in response to the operation on the target control element by the vehicle operator.

After the request of switching to the autonomous driving mode is generated, in the method 400 for controlling a vehicle of this embodiment, operation S420 may be performed to switch the vehicle from the manual driving mode to the autonomous driving mode. After the vehicle switches to the autonomous driving mode, the vehicle control method 400 of this embodiment may further include operation S450 in which the target control element is set to the non-enabled state, that is, the target control element is restored to the default state.

According to an embodiment of the present disclosure, in the method for controlling the vehicle, after the vehicle switches to the manual driving mode, for example, the stored route planning information may be periodically updated based on the real-time travelling route of the vehicle, so as to keep the stored route planning information as the information that well meets the travelling requirements of the vehicle. In this way, when the vehicle switches from the manual driving mode to the autonomous driving mode, a task performed before the vehicle is taken over by the vehicle operator may be continued based on the stored route planning information.

Specifically, in the method for controlling a vehicle of this embodiment, an actual travel route along which the vehicle travels in the latest complete cycle may be periodically determined in response to the vehicle switching from the autonomous driving mode to the manual driving mode. Then, the stored route planning information may be updated based on the actual travel route in the latest complete cycle.

The actual travel route may be acquired from a navigation information generated by a navigation system installed in the vehicle, or acquired from a driving recorder of the vehicle, which is not limited in this disclosure. For example, if the current time is 12:00 a.m. and the stored route planning information is updated at a period of 5 minutes, the actual travel route during a period from 11:55 a.m. to 12:00 a.m. may be acquired. Then it is determined whether the actual travel route is consistent with a certain route in the stored route planning information. If no route in the route planning information is consistent with the actual travel route, a current location of the vehicle may be used as a starting location, and route planning is performed based on an end location in the stored route planning information and the starting location. Finally, the stored route planning information is replaced with the route planning information obtained by the route planning, so as to achieve the updating of the stored route planning information.

Figure 5:
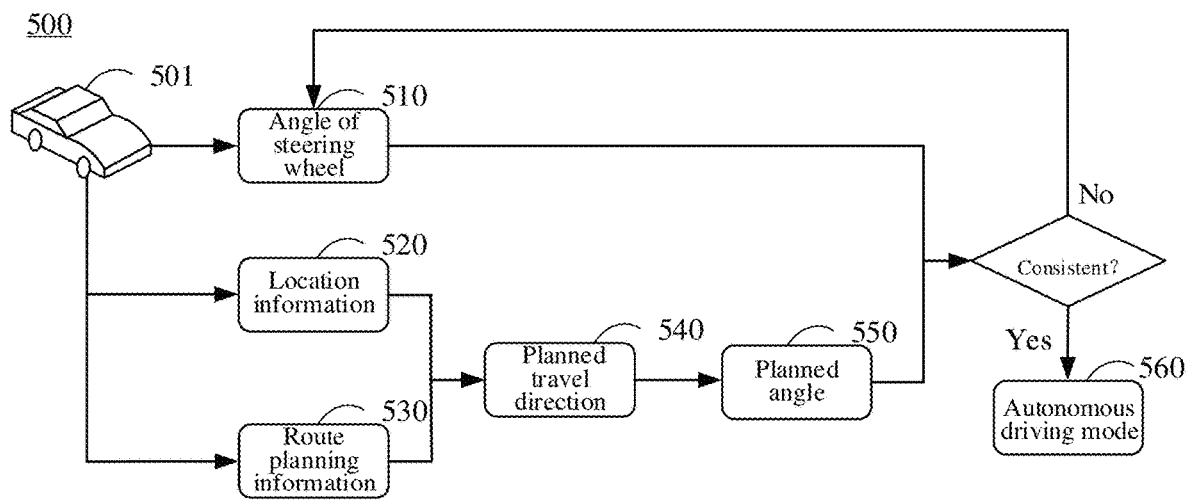
FIG. 5 shows a schematic diagram of a principle of a method for controlling a vehicle according to an embodiment of the present disclosure.

FIG. 5 shows a schematic diagram of a method for controlling a vehicle according to an embodiment of the present disclosure.

According to an embodiment of the present disclosure, when the vehicle switches to the autonomous driving mode in response to the request of switching to the autonomous driving mode, for example, it may be determined whether an angle of the steering wheel of the vehicle is matched with the stored route planning information based on a location information of the vehicle. After the angle of the steering wheel is adjusted to be matched with the stored route planning information, the mode switching is performed. In this way, in the process of switching to the autonomous driving mode, a situation that the vehicle has to to re-plan the route due to a mismatch between the travelling direction of the vehicle and an actual demand may be avoided. This may further improve the autonomous driving experience and reduce unnecessary resource consumption of the vehicle.

As shown in FIG. 5, in the embodiment 500, an angle 510 of a steering wheel of a vehicle 501 may be determined when switching the vehicle to the autonomous driving mode in response to the request of switching to the autonomous driving mode. The angle 510 of the steering wheel may be obtained, for example, through communication between the autonomous driving system and the bus control system of the vehicle. In addition, a current location information 520 of the vehicle 501 may be determined. The location information 520 may be obtained through communication with the positioning system. Subsequently, a stored route planning information 530 may be read from a storage unit of the vehicle 501. According to the location information 520 of the vehicle, a planned travel direction 540 for the vehicle located at a location indicated by the location information 520 in the route planning information 530 may be determined. According to a mapping relationship between the planned travel direction 540 for the vehicle and the angle of the steering wheel of the vehicle, a planned angle 550 for the vehicle located at the location indicated by the location information 520 is determined. The planned angle 550 is then compared with the angle 510 of the steering wheel so as to determine whether the two are consistent with each other. If the two are consistent with each other, it is determined that the angle 510 of the steering wheel is matched with the stored route planning information 530, otherwise, it is determined that the angle 510 of the steering wheel is not matched with the stored route planning information 530. If the planned angle 550 is not consistent with the angle 510 of the steering wheel, the angle 510 of the steering wheel may be adjusted through the communication between the autonomous driving system and the bus control system of the vehicle. After the angle 510 of the steering wheel is adjusted to be consistent with the planned angle 550, the vehicle is switched to the autonomous driving mode. If the planned angle 550 is consistent with the angle 510 of the steering wheel, the vehicle may be directly switched to the autonomous driving mode 560.

Based on the method for controlling a vehicle provided by the present disclosure, the present disclosure further provides an apparatus for controlling a vehicle. The apparatus will be described in detail below with reference to FIG. 6.

Figure 6:
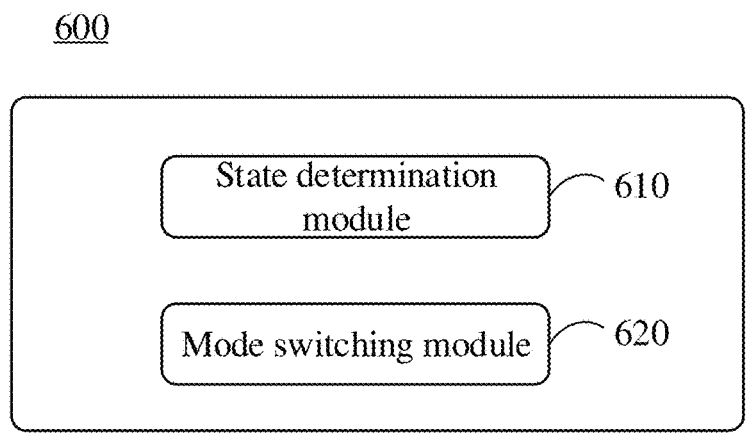
FIG. 6 shows a structural block diagram of an apparatus for controlling a vehicle according to an embodiment of the present disclosure.

FIG. 6 shows a structural block diagram of an apparatus for controlling a vehicle according to an embodiment of the present disclosure.

As shown in FIG. 6, the apparatus 600 for controlling a vehicle in this embodiment may include a state determination module 610 and a mode switching module 620.

The state determination module 610 is configured to determine, in response to the request of switching to the autonomous driving mode, whether the vehicle is in a safe state. In an embodiment, the state determination module 610 may be configured to perform operation S210 described above, which will not be repeated here.

The mode switching module 620 is configured to control, in response to the vehicle being in the safe state, the vehicle to switch from a manual driving mode to an autonomous driving mode during travelling. In an embodiment, the mode switching module 620 may be configured to perform the operation S220 described above, which will not be repeated here.

According to an embodiment of the present disclosure, the above-mentioned apparatus 600 for controlling a vehicle may further include a planning information storage module and a driving control module. The planning information storage module is configured to store, in response to the vehicle switching from the autonomous driving mode to the manual driving mode, a route planning information based on which the vehicle is travelling. The driving control module is configured to control, in response to the vehicle switching from the manual driving mode to the autonomous driving mode, the vehicle to travel based on the stored route planning information.

According to an embodiment of the present disclosure, the above-mentioned state determination module 610 may include a parameter determination sub-module and a state determination sub-module. The parameter determination sub-module is configured to determine, in response to the request of switching to the autonomous driving mode, a driving parameter of the vehicle. The state determination sub-module is configured to determine, based on the driving parameter, whether the vehicle is in the safe state.

According to an embodiment of the present disclosure, the above state determination module 610 is configured to periodically determine, in response to the vehicle switching from the autonomous driving mode to the manual driving mode, whether the vehicle is in the safe state. The state determination module may include a parameter determination sub-module and a state determination sub-module. The parameter determination sub-module is configured to determine a driving parameter of the vehicle. The state determination sub-module is configured to determine, based on the driving parameter, whether the vehicle is in the safe state.

According to an embodiment of the present disclosure, the above-mentioned state determination sub-module is configured to determine that the vehicle is in the safe state in response to the driving parameter including at least one of: a speed of the vehicle being less than a speed threshold; a distance between a location of the vehicle and an intersection being greater than a distance threshold; an angle between a direction along which the vehicle is travelling and a length direction of a lane where the vehicle is located being less than a first angle threshold; or, a rotation angle of a steering wheel of the vehicle being less than a second angle threshold.

According to an embodiment of the present disclosure, the above-mentioned apparatus 600 for controlling a vehicle may further include a planning information updating module configured to periodically perform, in response to the vehicle switching from the autonomous driving mode to the manual driving mode, operations of: determining an actual travel route along which the vehicle travels within a latest complete cycle; and updating the stored route planning information based on the actual travel route.

According to an embodiment of the present disclosure, the above-described apparatus 600 for controlling a vehicle may further include a state setting module. The state setting module is configured to set, in response to the vehicle being travelling in the manual driving mode and being in the safe state, a target control element displayed by the vehicle to an enabled state. The request of switching to the autonomous driving mode is generated in response to an operation on the target control element in the enabled state.

According to an embodiment of the present disclosure, the above-described apparatus 600 for controlling a vehicle may further include a state setting module. The state setting module is configured to set, in response to the vehicle travelling in the manual driving mode, a target control element displayed by the vehicle to an enabled state. The request of switching to the autonomous driving mode is generated in response to an operation of the target control element in the enabled state.

According to an embodiment of the present disclosure, the above state setting module is further configured to set, in response to the vehicle being in an unsafe state, the target control element displayed by the vehicle to a non-enabled state; and to set, in response to the vehicle changing from the unsafe state to the safe state, the target control element to the enabled state. The above state determination module is further configured to periodically determine whether the vehicle is in the safe state.

According to an embodiment of the present disclosure, the above-mentioned mode switching module 620 may include a matching sub-module, an adjustment sub-module, and a switching sub-module. The matching sub-module is configured to determine, based on a location information of the vehicle, whether an angle of a steering wheel of the vehicle is matched with the stored route planning information. The adjustment sub-module is configured to adjust, in response to the angle of the steering wheel of the vehicle being not matched with the stored route planning information, the angle of the steering wheel until the angle of the steering wheel is matched with the stored route planning information. The switching sub-module is configured to switch, in response to the angle of the steering wheel of the vehicle being matched with the stored route planning information, the vehicle to the autonomous driving mode.

Collecting, storing, using, processing, transmitting, providing, and disclosing etc. of the personal information of the user involved in the present disclosure all comply with the relevant laws and regulations, are protected by essential security measures, and do not violate the public order and morals. According to the present disclosure, personal information of the user is acquired or collected after such acquirement or collection is authorized or permitted by the user.

According to an embodiment of the present disclosure, the present disclosure further provides an electronic device, a readable storage medium, and a computer program product.

Figure 7:
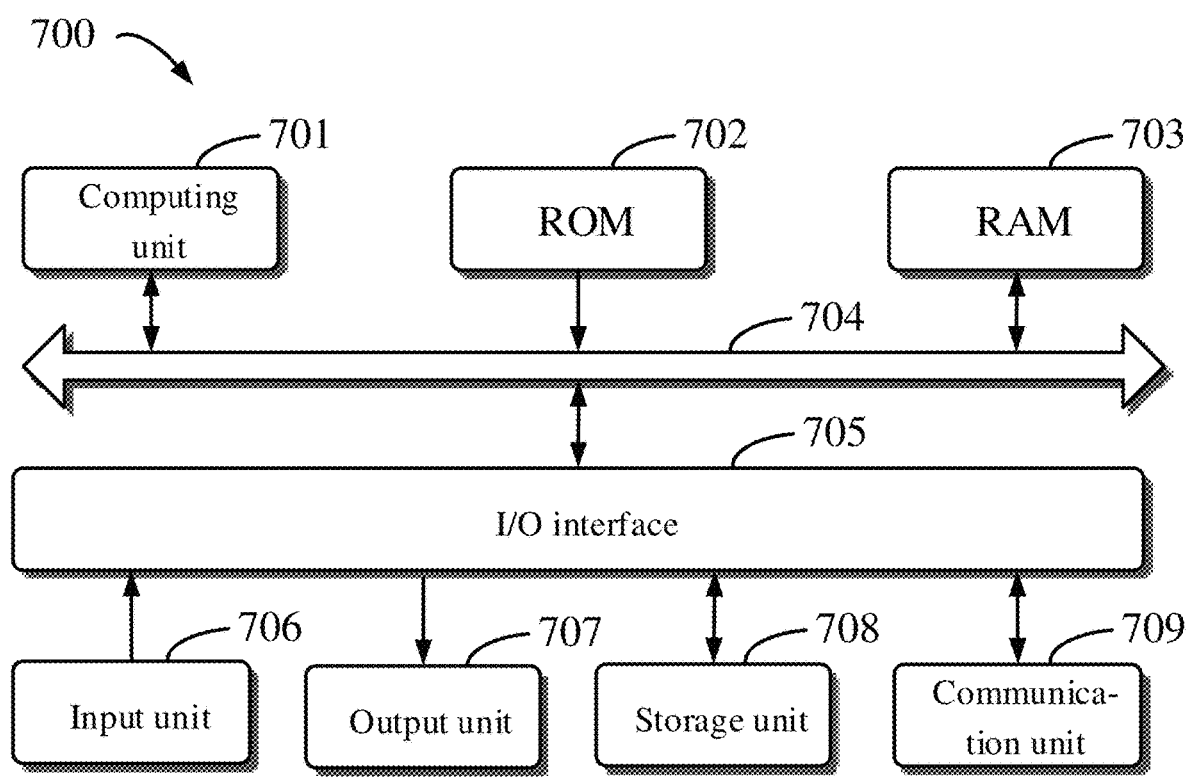
FIG. 7 shows a block diagram of an electronic device for implementing a method for controlling a vehicle of an embodiment of the present disclosure.

FIG. 7 shows a schematic block diagram of an exemplary electronic device 700 that may be applicable to the implementation of the method for controlling a vehicle of the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 may include a computing unit 701, which may perform various appropriate actions and processing based on a computer program stored in a read-only memory (ROM) 702 or a computer program loaded from a storage unit 708 into a random-access memory (RAM) 703. Various programs and data required for the operation of the electronic device 700 may be stored in the RAM 703. The computing unit 701, the ROM 702, and the RAM 703 are connected to each other through a bus 704. An input/output (I/O) interface 705 is also connected to the bus 704.

Various components in the electronic device 700, including an input unit 706 such as a keyboard, a mouse, etc., an output unit 707 such as various types of displays, speakers, etc., a storage unit 708 such as a magnetic disk, an optical disk, etc., and a communication unit 709 such as a network card, a modem, a wireless communication transceiver, etc., are connected to the I/O interface 705. The communication unit 709 allows the electronic device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 701 may perform the various methods and processes described above, such as the method for controlling a vehicle. For example, in some embodiments, the method for controlling a vehicle may be implemented as a computer software program that is tangibly contained on a machine-readable medium, such as the storage unit 708. In some embodiments, part or all of a computer program may be loaded and/or installed on the electronic device 700 via the ROM 702 and/or the communication unit 709. When a computer program is loaded into the RAM 703 and executed by the CPU 701, one or more steps in the method for controlling a vehicle described above may be performed. Alternatively, in other embodiments, the computing unit 701 may be configured to perform the method for controlling a vehicle in any other appropriate way (for example, by means of firmware).

Based on the above-mentioned electronic device, the present disclosure further provides an autonomous driving vehicle including the above-mentioned electronic device for performing the above-mentioned method for controlling a vehicle.

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host. It is a host product in the cloud computing service system to solve shortcomings of difficult management and weak business scalability existing in the traditional physical host and VPS (Virtual Private Server) service. The server may also be a server of a distributed system or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method for controlling a vehicle, comprising:
   determining, in response to a request of switching to an autonomous driving mode, whether the vehicle is in a safe state;
   controlling, in response to the vehicle being in the safe state, the vehicle to switch from a manual driving mode to the autonomous driving mode during travelling;
   storing, in response to the vehicle switching from the autonomous driving mode to the manual driving mode, a route planning information based on which the vehicle is travelling; and
   controlling, in response to the vehicle switching from the manual driving mode to the autonomous driving mode, the vehicle to travel based on the stored route planning information, wherein
   the controlling, in response to the vehicle being in the safe state, the vehicle to switch from a manual driving mode to the autonomous driving mode during driving includes:
      determining, based on a location information of the vehicle, whether an angle of a steering wheel of the vehicle is matched with the stored route planning information;
      adjusting, in response to the angle of the steering wheel of the vehicle being not matched with the stored route planning information, the angle of the steering wheel until the angle of the steering wheel is matched with the stored route planning information; and
      switching, in response to the angle of the steering wheel of the vehicle being matched with the stored route planning information, the vehicle from the manual driving mode to the autonomous driving mode.

2. The method of claim 1, wherein the determining, in response to a request of switching to an autonomous driving mode, whether the vehicle is in a safe state comprises:
 determining, in response to the request of switching to the autonomous driving mode, a driving parameter of the vehicle; and
 determining, based on the driving parameter, whether the vehicle is in the safe state.

3. The method of claim 2, wherein the determining, based on the driving parameter, whether the vehicle is in the safe state comprises:
 determining that the vehicle is in the safe state in response to the driving parameter including at least one of:
 a speed of the vehicle being less than a speed threshold;
 a distance between a location of the vehicle and an intersection being greater than a distance threshold;
 an angle between a direction along which the vehicle is travelling and a length direction of a lane where the vehicle is located being less than a first angle threshold; or
 a rotation angle of a steering wheel of the vehicle being less than a second angle threshold.

4. The method of claim 2, further comprising:
 setting, in response to the vehicle travelling in the manual driving mode, a target control element displayed by the vehicle to an enabled state,
 wherein the request of switching to the autonomous driving mode is generated in response to an operation on the target control element in the enabled state.

5. The method of claim 4, further comprising:
 setting, in response to the vehicle being in an unsafe state, the target control element displayed by the vehicle to a non-enabled state,
 periodically determining whether the vehicle is in the safe state; and
 setting, in response to the vehicle changing from the unsafe state to the safe state, the target control element to the enabled state.

6. The method of claim 1, further comprising in response to the vehicle switching from the autonomous driving mode to the manual driving mode, periodically determining whether the vehicle is in the safe state by:
 determining a driving parameter of the vehicle; and
 determining, based on the driving parameter, whether the vehicle is in the safe state.

7. The method of claim 6, further comprising:
 setting, in response to the vehicle being travelling in the manual driving mode and being in the safe state, a target control element displayed by the vehicle to an enabled state,
 wherein the request of switching to the autonomous driving mode is generated in response to an operation on the target control element in the enabled state.

8. The method of claim 1, further comprising in response to the vehicle switching from the autonomous driving mode to the manual driving mode, periodically performing operations of:
 determining an actual travel route along which the vehicle travels within a latest complete cycle; and
 updating the stored route planning information based on the actual travel route.

9. A non-transitory computer-readable storage medium having computer instructions stored thereon, wherein the computer instructions allow a computer to implement the method of claim 1.

10. An electronic device, comprising:
 at least one processor; and
 a memory communicatively connected to the at least one processor,
 wherein the memory stores instructions executable by the at least one processor, and the instructions, when executed by the at least one processor, cause the at least one processor to implement the method of claim 1.

11. The electronic device of claim 10, wherein the at least one processor is further configured to:
 determine, in response to the request of switching to the autonomous driving mode, a driving parameter of the vehicle; and
 determine, based on the driving parameter, whether the vehicle is in the safe state.

12. The electronic device of claim 11, wherein the at least one processor is further configured to:
 determine that the vehicle is in the safe state in response to the driving parameter including at least one of:
 a speed of the vehicle being less than a speed threshold;
 a distance between a location of the vehicle and an intersection being greater than a distance threshold;
 an angle between a direction along which the vehicle is travelling and a length direction of a lane where the vehicle is located being less than a first angle threshold; or
 a rotation angle of a steering wheel of the vehicle being less than a second angle threshold.

13. The electronic device of claim 11, wherein the at least one processor is further configured to:
 set, in response to the vehicle travelling in the manual driving mode, a target control element displayed by the vehicle to an enabled state,
 wherein the request of switching to the autonomous driving mode is generated in response to an operation on the target control element in the enabled state.

14. The electronic device of claim 10, wherein the at least one processor is further configured to in response to the vehicle switching from the autonomous driving mode to the manual driving mode, periodically determine whether the vehicle is in the safe state by:
 determining a driving parameter of the vehicle; and
 determining, based on the driving parameter, whether the vehicle is in the safe state.

15. The electronic device of claim 14, wherein the at least one processor is further configured to:
 set, in response to the vehicle being travelling in the manual driving mode and being in the safe state, a target control element displayed by the vehicle to an enabled state,
 wherein the request of switching to the autonomous driving mode is generated in response to an operation on the target control element in the enabled state.

16. The electronic device of claim 10, wherein the at least one processor is further configured to in response to the vehicle switching from the autonomous driving mode to the manual driving mode, periodically perform operations of:
 determining an actual travel route along which the vehicle travels within a latest complete cycle; and
 updating the stored route planning information based on the actual travel route.

17. An autonomous vehicle, comprising the electronic device of claim 10.

* * * * *